Inventor
Henry Ford,
By
Attorneys

Sept. 2, 1924.

H. FORD

ELECTRIC GENERATOR

Filed Nov. 5, 1920

Inventor
Henry Ford,
By
Attorneys

Patented Sept. 2, 1924.

1,507,348

UNITED STATES PATENT OFFICE.

HENRY FORD, OF DEARBORN, MICHIGAN.

ELECTRIC GENERATOR.

Application filed November 5, 1920. Serial No. 421,859.

*To all whom it may concern:*

Be it known that I, HENRY FORD, a citizen of the United States of America, residing at Dearborn, in the county of Wayne and State of Michigan, have invented certain new and useful Improvements in Electric Generators, of which the following is a specification, reference being had therein to the accompanying drawings.

My invention relates to electric generators for power plant use and more particularly relates to double current output generators.

The general object of the present invention is to provide a generator adapted to form an integral part of a self contained single unit power plant especially suited to the requirements peculiar to relatively small isolated installations for industrial purposes. To this end, and others which will hereinafter become apparent, my invention comprehends a novel organization and construction for a generator specifically illustrated by the embodiment of my invention herein set forth.

The embodiment of my invention herein illustrated and described is the generator section of a self contained single vertical unit hydro-electric power plant for relatively small isolated installations, where the output is required to satisfy a large variety of needs rather than a large volume load. Thus, for example, it is feasible by the present invention to develop individually for direct industrial use alone or together with a limited local service supply in rural districts, a large number of relatively small scattered water power sites which have heretofore not justified the development and installation usually necessary.

The ability of this generator to supply selectively or simultaneously both direct and alternating current strongly recommends it as an isolated installation for small industrial establishments where the direct current may be needed for the usual nearby motive power requirements and where the alternating current may be needed for economical electric welding or for the supply of the electric motive power under conditions where sparking at the brushes is not permissible, or under conditions where the voltage must be boosted to facilitate transmission to relatively remote motor or lighting installations or for laboratory purposes or for supplying to a limited extent surplus or off hour service for domestic or other non-industrial purpose.

At the same time its particular construction enhances a relatively low first cost, safety and simplicity of operation, economy of installation and reliability of performance.

In Figure 1 of the drawings I have shown a vertical axial section of a generator constructed in accordance with my invention;

Figure 1:
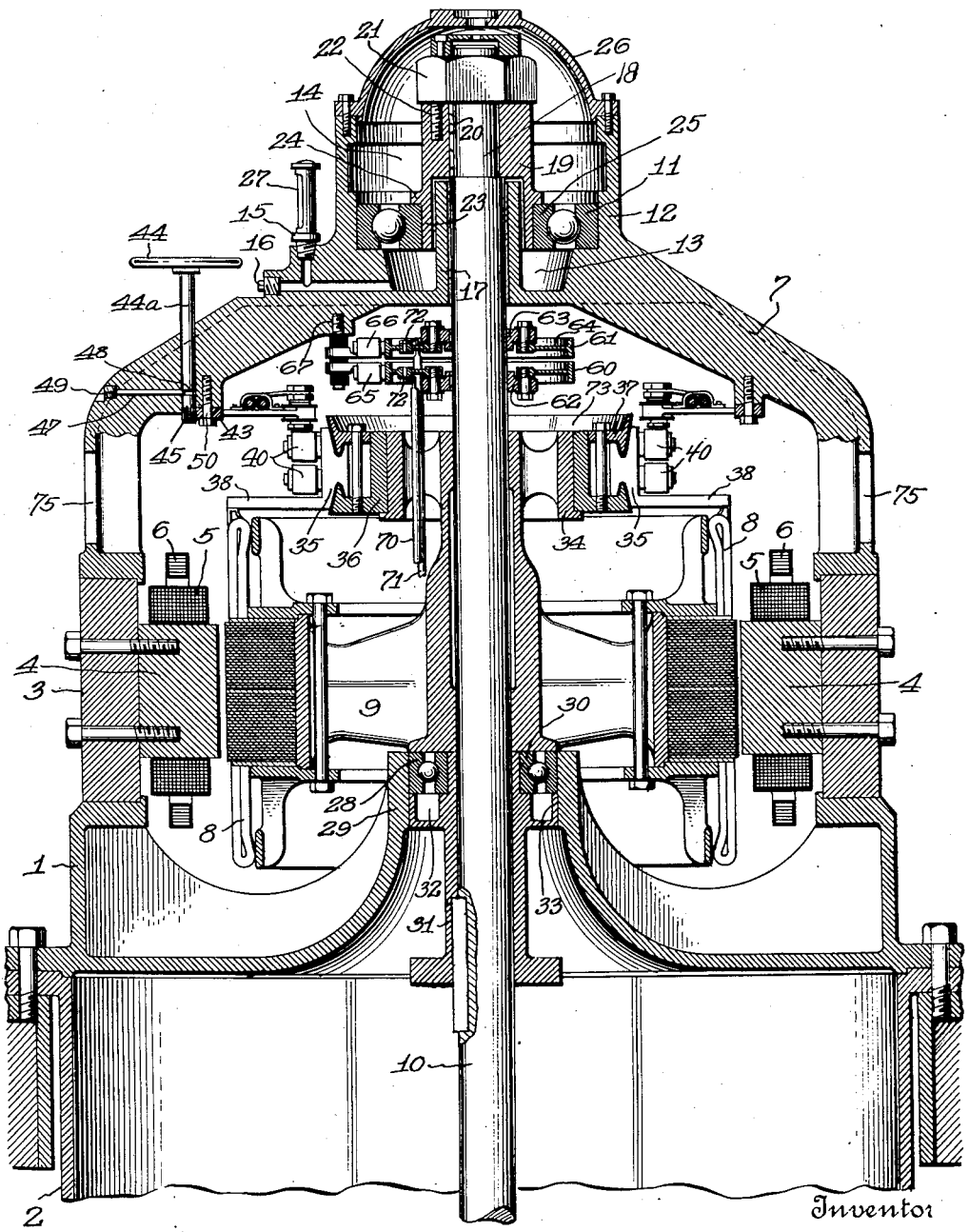

The lower end frame 1 constitutes the generator base and is preferably annular in form. Its lower end is adapted to rest centrally upon the tubular casing 2 which is a rigid vertical extension of the prime mover, in this case a horizontally rotatable water turbine, and may be bolted therewith to a foundation. Upon the upper end of this end frame is centrally secured the horizontally disposed field frame 3 carrying internally eight angularly equidistant and electromagnetically equivalent pole pieces 4 each provided with a coil of the field shunt winding 5 and series winding 6 and this field frame has centrally secured to its upper end the annular upper end frame 7.

An armature comprising a laminated annular core slotted to receive the armature coils 8 and mounted on a spider 9 the hub of which is rigidly fixed to the vertical armature spindle or shaft 10 is constrained and carried by the upper and lower armature shaft bearings to be horizontally rotatable within the field.

The upper bearing is an annular combined radial and thrust ball bearing having its external raceway 11 set into an annular cavity formed in a central hub 12 of the upper end frame 7. In this hub, directly beneath the bearing cavity is provided an annular oil well 13 having an upwardly divergent outer wall leading into the ball race of the bearing and above the cavity in the space intervening between its upper edge and the open end of the hub bore is an annular undercut overflow recess 14. The oil well is provided with a duct communicating with the combined filling tube and sight glass 15 and the draining plug 16.

Through the neck 17 which projects upwardly from the bottom of the oil well 13 to a point just above the overflow recess 14 and forms a central inner wall for the annuli within the hub 12, passes the upper end of the armature shaft 10 clearing the inner surface of the neck in its passage. The end of the shaft projecting through the neck 17 is shouldered a short distance above the upper end of the neck and reduced in diameter at 18 to receive the bearing engaging hub 19 which is keyed to the shaft at 20 and held thereon by the nut 21 screw-threaded to an extension of the reduced portion 18 which nut is locked by the screw 22. The bearing engaging hub overhangs the neck 17 and is recessed to clear the exterior portion thereof by a clearance of sufficient magnitude to overcome the capillary attraction between the adjacent surfaces of the neck and the over-hanging hub wall 23 which latter is shouldered at 24 and fitted to the internal raceway 25 of the bearing. A removable cover cap 26 completes the enclosure of the bearing mechanism.

Presuming the filler tube to be filled until the oil is just visible in the sight glass 27 the height of the neck 17 will prevent the oil passing down the armature shaft and when the machine is in motion the whirling movement imparted by the adjacent moving parts will cause the oil to flow outwardly away from the neck and the overhanging wall of the hub and to rise up the inclined sides of the oil well 13, through the ball race and if of sufficient volume to flow into the recess 14, the residual oil intermediate the neck and the recessed portion of the hub wall 23 meanwhile spreading over the rotating interior of said recess and being thrown out of its open bottom end. This will provide a moving annulus of oil for the upper bearing while avoiding fouling the exposed electrical element of the machine.

The lower armature shaft bearing is located under the armature with its central plane adjacent the plane of the pole pieces of the field and its outer raceway 28 is fitted into the bore of a hub 29 formed concentric with the lower end frame 1. The inner raceway 30 of the bearing is mounted on a sleeve 31 fixed to the armature shaft and provided with an oil well 32. The upper and lower ends of the inner raceway 30 of the bearing bear respectively against the lower end of the hub of the armature spider which is spread outwardly to cover the bearing, and a shoulder formed on the retaining sleeve 31. Thus the bearing is held axially in place. The outer raceway 28 however may clear the lower end of the armature hub and the upper end of the outer wall 33 of the oil well 32 and the periphery of this wall is provided with clearance within the bore engaging with the periphery of the outer raceway of the bearing.

The output of the generator may be taken from either or both of two branches constituting the external circuit of the machine. A commutator having a co-operating set of brushes that lead off and rectify that portion of the armature currents constituting the field exciting current and the direct current output of the machine, providing for one branch; and a pair of collector rings having a co-operating set of brushes that lead off the remaining portion of the armature currents as they are which constitutes the alternating current out put, providing for the second branch.

To this end, a peripheral type of commutator is rigidly mounted upon the rim of a spoked drum 34 preferably formed integral with an upwardly extending end of the hub of the armature spider. This commutator is built up of a plurality of segments 35 clamped as a composite annulus of angularly arranged conductor bars insulated from one another and from their mounting, between the inturned flanges of the flanged collar 36 and its clamping ring 37 which are bolted together as shown. Each segment may be provided with a conducting bar 38 for connecting to its commutating point of the armature winding which may in this embodiment be presumed to be a continuous closed coil.

Eight annularly mounted duplex brushes 40 bear against the periphery of the commutator, each pair of brushes being pivotally mounted on an insulated stud 41 carried in one of the inwardly extending arms 42 rigidly attached to a brush carrying ring 43 held horizontally and concentric with the armature shaft to the inner side of the end frame 7 to permit of a limited amount of concentric angular movement whereby the lead or lag adjustment of the brushes is obtained. A hand wheel 44 having a spindle 44ᵃ passing through and journaled in the end frame as shown in Figure 1 and having formed on its lower end the pinion 45 which meshes with the rack teeth 46 formed in a portion of the periphery of the brush carrying ring 43 is provided for shifting the latter; and this hand wheel spindle is secured longitudinally by a pin 47 engaging at its inner end, an annular groove 48 formed in the spindle and backed at its outer end by the set screw 49.

The fastening means for the brush carrying ring may consist in a plurality of cap screws 50 passing through arcuate slots 51 formed in the ring and threaded into bosses of the frame end member machined with their surfaces in a common plane, it being intended that the heads of the screws shall merely hold the ring in place against the lower surface supporting bosses and not pinch the ring.

Figure 2:
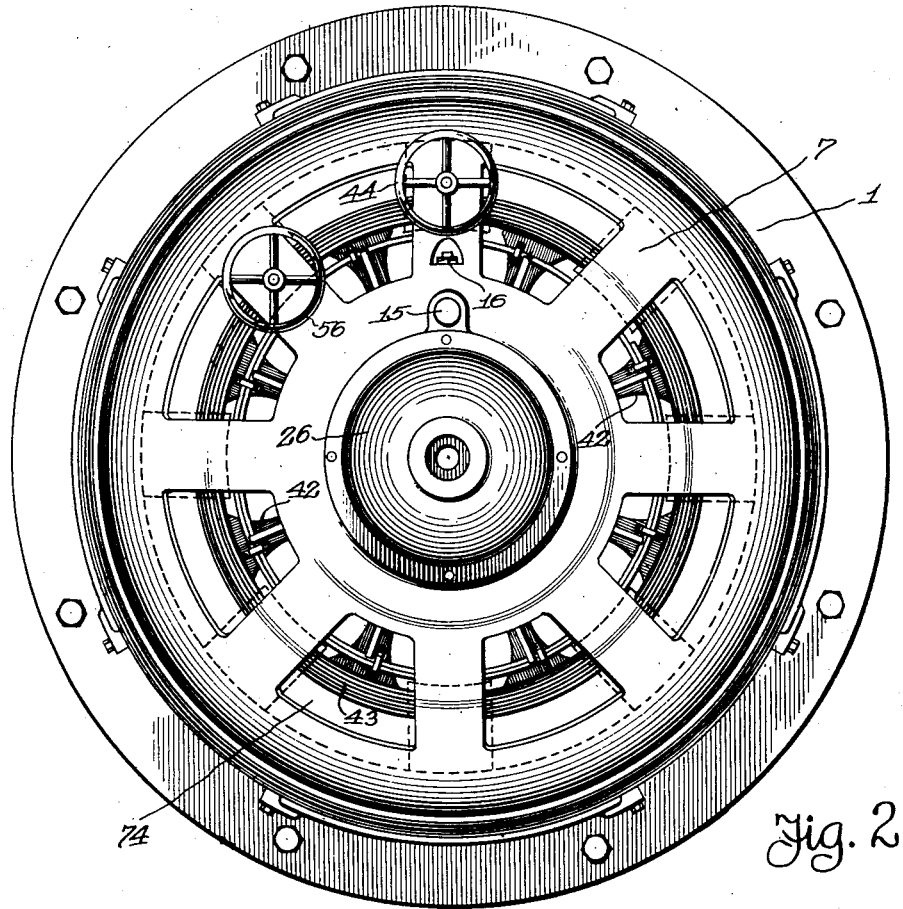
Fig. 2 is a plan view of the machine shown in Fig. 1.
Figure 4:
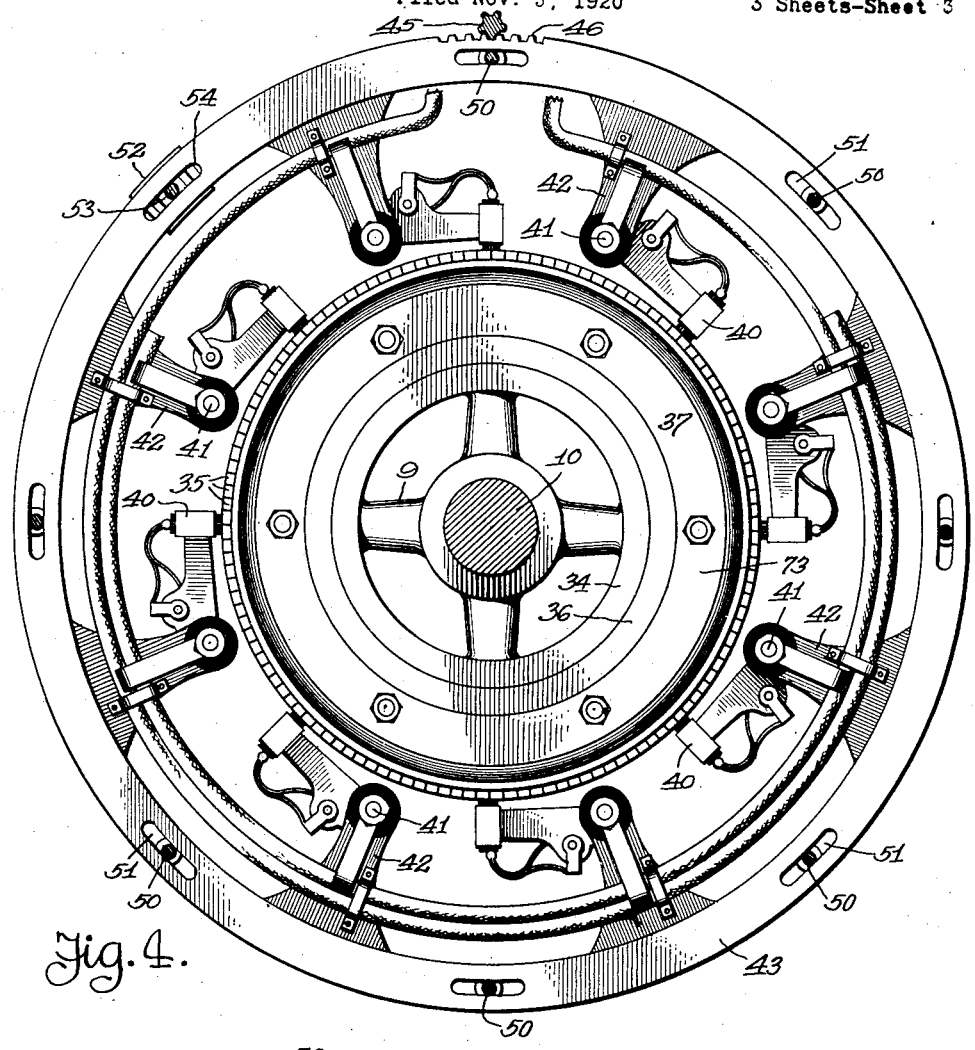
Fig. 4 is a similar view of the commutator, its brushes and brush carrier and the adjusting mechanism therefor.
Figure 5:
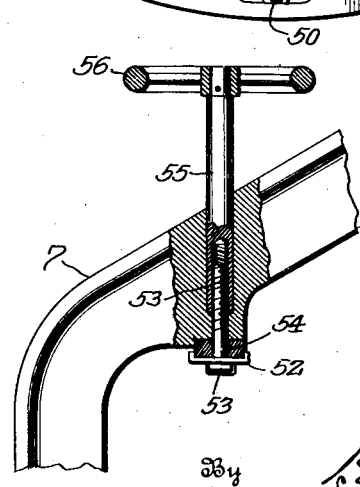
Fig. 5 is a detail view constituting a vertical fragmentary section of the locking device for the brush carrier.

A device for clamping or locking the brush carrying ring in its adjusted position is shown in Figures 2, 4 and 5. This consists in a clamp plate 52 having a pair of upturned flanges embracing the sides of the ring; a bolt 53 having its head secured to and its shank passing through the clamp plate, through the arcuate slot 54 of the ring, through the lower portion of the end frame and the screw-thread portion of said shank threaded into the hollow end of a spindle 55. The lower end of the spindle is set into a counterbored portion of the bolt hole and its upper end is provided with a hand wheel 56.

Figure 3:
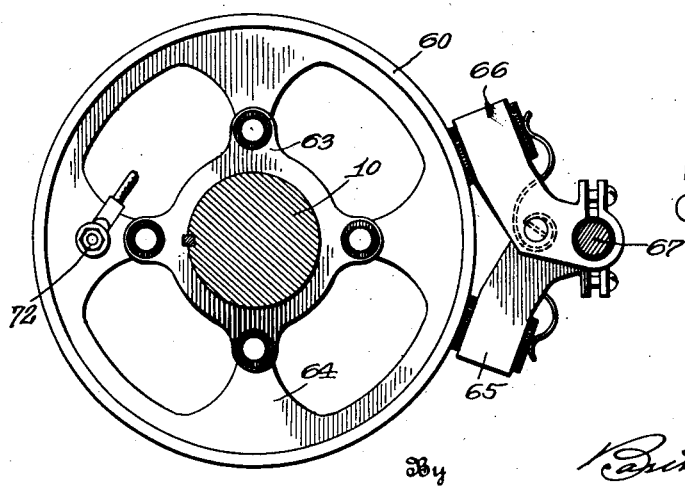
Fig. 3 is a detail view in plan of the collector rings and their brushes.

The collector rings 60 and 61 are preferably considerably smaller in diameter than is the commutator, and are each rigidly mounted on an individual flange 62 keyed to and axially spaced on the armature shaft between the commutator and the upper bearing as shown in Figures 1 and 3. The mounting comprises a plurality of outwardly extending bosses 63 formed on the flanges to which are bolted the inwardly extending arms 64 formed in the collector rings by bolts passing through insulating bushings in the flanges and threaded into the arms of the rings. An insulating washer is also interposed between the arms and bosses of the two members thus secured. The brushes 65 and 66, one for each ring, are pivotally mounted and spaced apart on a stud 67 threaded into the end frame and are insulated both from the frame and from each other. The leads 70 and 71 attached as shown at 72, in Figure 3, are taken respectively from the rings 60 and 61 and passing through an open central portion of the commutator mounting are each tapped to the armature windings at four appropriate points. That is, they are alternately tapped into the windings at eight simultaneously no voltage points.

The upper side of the inert portion of the commutator is formed into a sort of receptacle by forming annular recess 73 therein. In the present instance, this is formed by the upstanding annular flange of the ring 37 and the diameter of this recess or cavity should be substantially larger than the diameter of the collector rings, whereby the metal particles as they are dislodged from the rings and their brushes by wear will be caught in this cavity and prevented from lodging on the commutator segments.

To enhance this action the air above the commutator is kept substantially stagnant aside from its whirling movement and thus the openings 74 in the upper end frame are adapted to be closed, openings 75 alone in the upper end frame being left open for venting or circulation.

Having thus fully described my invention, what I claim is:—

1. In an electric generator, the combination with a field, having an armature rotatably mounted therein and an end frame mounted at one end of the field, of a collector-ring formation and its brushes mounted within the end frame, a commutator mounted between the armature and said collector-ring formation and within the end frame, a plurality of brushes arranged about the commutator, an annular brush holder comprising a ring rotatably secured to and within the end frame and extending in a plane normal to the axis of rotation of the commutator intermediate the collector-ring formation and the commutator, said ring having a plurality of inwardly extending arms upon which the brushes are pivotally mounted and from which they are insulated, and means for connecting alternate brushes to one of the sides of their common circuit.

2. In an electric generator, the combination with a field having an armature rotatably mounted therein and an end frame mounted at one end of the field, of a commutator mounted at one end of the armature and within the end frame, a plurality of brushes arranged about the commutator, an annular brush carrier having a ring rotatably secured within the end frame and means for imparting a limited amount of rotative movement to the ring including an arcuate rack arranged about the ring and fixed with relation thereto, a bearing in the end frame, a rotatable spindle having a pinion at its inner end meshing with said rack and passing through the bearing in the end frame wherein it is journaled, an annular groove formed in that portion of said spindle within its bearing, a pin set into a side of said spindle bearing transversely thereof and having one end projecting into said groove, means for holding the pin toward the spindle, and external means for rotating the spindle.

3. In a vertical double current electric generator, the combination with a horizontally rotatable peripheral collector ring of relatively small diameter and a brush engaging with the periphery thereof, of a horizontally rotatable commutator of relatively large diameter mounted directly beneath the collector ring and having formed in the electrically inert portion of its upper end an annular recess circumscribing the periphery of the ring and adapted to collect the metallic particles that are dislodged from the ring and its brush.

4. In a vertical double current electric generator, the combination with a commutator and a pair of peripheral collector rings mounted respectively and successively one above the other upon a rotatable conductor-carrying shaft, of a pair of brush arms one for each ring pivotally mounted upon a common stationary axially extending stud and having their brush carrying ends extending in opposite directions about the peripheries of the rings, a pair of brushes mounted one in each of the arms and each adapted to be held to its ring in angularly spaced relation with respect to the other whereby the particles dislodged by each brush in its cooperation with its ring will fall clear of the accompanying brush, and means intermediate the collector rings and the electrically active portions of the commutator for collecting the particles dislodged by the brush of the collector rings.

In testimony whereof I affix my signature in presence of two witnesses.

HENRY FORD.

Witnesses:
E. G. LIEBOLD,
J. EMMET HALL.